United States Patent
Bae

(10) Patent No.: US 6,792,042 B1
(45) Date of Patent: Sep. 14, 2004

(54) PULSE WIDTH MODULATION CONTROL SYSTEM

(75) Inventor: Gyu Sung Bae, Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 844 days.

(21) Appl. No.: 09/612,546

(22) Filed: Jul. 7, 2000

(30) Foreign Application Priority Data

Jul. 9, 1999 (KR) .................................... 99-27754

(51) Int. Cl.$^7$ ............................................. H02M 1/096
(52) U.S. Cl. ........................... 375/238; 363/95; 363/84
(58) Field of Search .......................... 375/238; 363/41, 363/95, 84

(56) References Cited

U.S. PATENT DOCUMENTS

| | | | | |
|---|---|---|---|---|
| 4,502,024 A | * | 2/1985 | Nishikawa et al. ......... | 332/109 |
| 4,617,675 A | * | 10/1986 | Ashikaga et al. ........... | 375/238 |
| 4,691,269 A | * | 9/1987 | Yamane et al. .............. | 363/41 |
| 4,723,201 A | * | 2/1988 | Tanamachi et al. .......... | 363/41 |
| 4,757,434 A | * | 7/1988 | Kawabata et al. ............ | 363/41 |
| 4,984,147 A | * | 1/1991 | Araki ........................ | 363/84 |
| 4,989,128 A | * | 1/1991 | Ohyama et al. .............. | 363/41 |
| 5,914,984 A | * | 6/1999 | Di Guardo et al. ......... | 375/238 |

* cited by examiner

Primary Examiner—Stephen Chin
Assistant Examiner—Sudhanshu C. Pathak
(74) Attorney, Agent, or Firm—Birch, Stewart, Kolasch & Birch, LLP

(57) ABSTRACT

The present invention relates to a pulse width modulation control system which is capable of preventing arm short phenomenon and controlling a operation circuit precisely by securing dead time. The present invention comprises a counter which sets initial voltage value differently and outputs chopping wave crossed at its maximum voltage value and minimum voltage value, an adder/subtracter which adds/subtracts signal generated by the counter, a reference voltage value generation unit which is inputted signal outputted from the adder/subtracter and outputs two different reference voltage values to single chopping wave, a comparator which compares reference voltage value generated by the reference voltage value generation unit with voltage value outputted from the adder/subtracter, and an output control unit which outputs PWM (Pulse Width Modulation) positive signal ($S_{PWM+}$) or PWM (Pulse Width Modulation) negative signal ($S_{PWM-}$) in accordance with the output voltage value of the comparator.

9 Claims, 6 Drawing Sheets

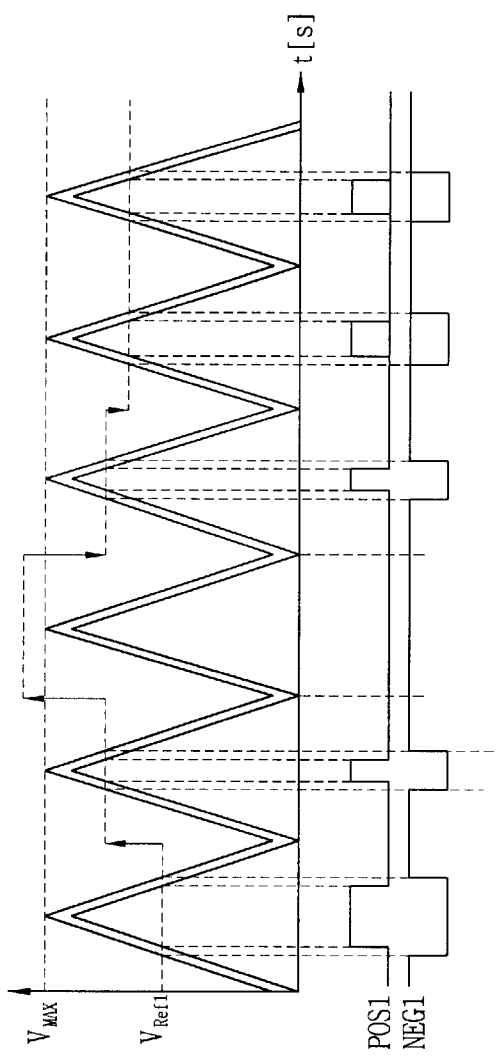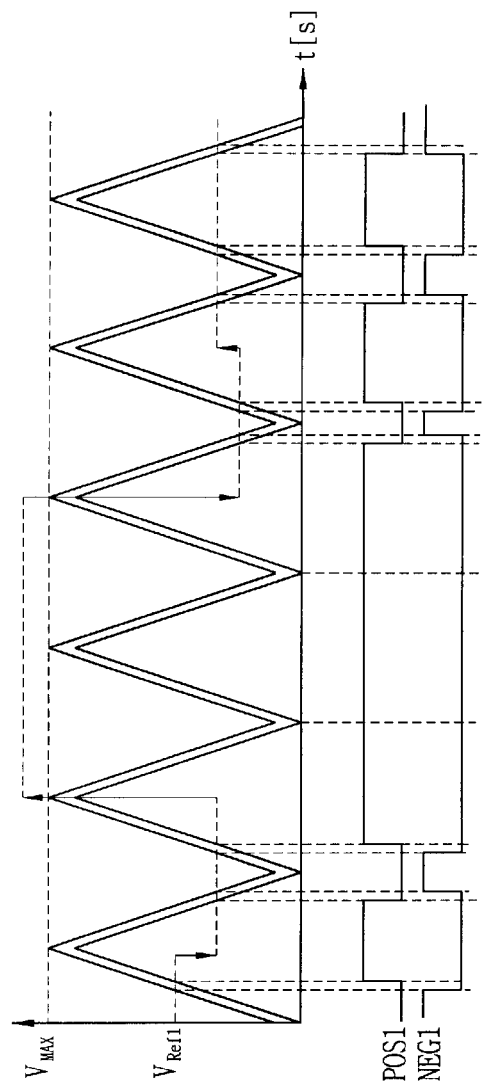
FIG. 3A
CONVENTIONAL ART
FIG. 3B
CONVENTIONAL ART

PULSE WIDTH MODULATION CONTROL SYSTEM

BACKGROUND OF THE INVENTION

1. Field of the Invention

The present invention relates to a pulse width modulation control system, in particular to the pulse width modulation control system which is capable of preventing arm short phenomenon, performing precision control of a three-phase inverter and a converter by securing dead time in pulse width modulation control by setting two reference voltage values and its renewal start point as start point of an up/down counter.

2. Description of the Prior Art

Pulse width modulation is a method which changes pulse width in accordance with amplitude of signal wave. In particular, sine wave pulse width modulation is a method which orderly changes width of output pulse in order to get current flow of a motor similar to sine wave, torque ripple of a motor is small in low frequency extent, accordingly the method is widely used in recent years.

The conventional pulse width modulation control system comprises an up/down counter which outputs chopping wave (Carrier Signal), a comparator which compares the chopping wave outputted from the up/down counter with three-phase reference signal having sine wave pattern, and an output control unit which is inputted the signal outputted from the comparator and outputs load voltage to a operating circuit of a motor.

The conventional pulse width modulation control system will now be described with reference to the accompanying drawings.

FIG. 1A, FIG. 1B and FIG. 1C are wave form diagrams of input/output signal of the conventional pulse width modulation control system. FIG. 1A depicts three-phase sine wave used as reference signal and the chopping wave outputted from the counter. FIG. 1B depicts load voltage generated in accordance with the comparison between the three-phase sine wave and chopping wave.

FIG. 2 is a circuit diagram of the conventional three-phase inverter operation circuit, it comprises six switches, two switches between the six switches connected to same load (same phase between the three-phase) perform complemented switch operation. In other words, positive signal between the load voltage signal is provided to the load through S1 switch, negative signal between the load voltage signal is provided to the load through S4 switch. Herein the negative signal is ON after the positive signal is OFF, or the negative signal is OFF after the positive signal is ON.

According to this, current flows on load L1 as depicted in FIG. 1C. Current flows on load L2 and load L3 in accordance with the same switch operation of the load L1.

Herein, a certain amount of time is required to be the negative signal ON after the positive signal is OFF, or to be the positive signal ON after the negative signal is OFF, the required time is dead time. When the dead time does not exist or is not continued a certain time, arm short phenomenon is generated.

FIG. 3A and FIG. 3B are wave form diagrams of chopping wave having upper carrier and lower carrier. As depicted in FIGS. 3A and 3B, a dual carrier method uses two kinds of chopping signal (Carrier Signal). The method is used in order to prevent arm short phenomenon. FIG. 3A illustrates renewal of reference voltage value at minimum voltage value of the chopping wave, and FIG. 3B illustrates renewal of reference voltage value at maximum voltage value of the chopping wave.

However, when reference signal exists between the upper carrier and lower carrier, arm short phenomenon may be generated in the dual carrier method due to lack of the dead time. To solve above mentioned problem, the dual carrier method renews reference voltage value at the next maximum voltage value or performs over modulation operation.

Nevertheless, precision control of a inverter and converter is impossible because the positive signal always outputs on signal regardless of wave pattern of the chopping wave and the negative signal always outputs off signal.

SUMMARY OF THE INVENTION

It is an object of the present invention to provide a pulse width modulation control system which is capable of securing dead time, and performing precision control of a three-phase inverter or converter by renewing reference voltage value not at maximum or minimum voltage value of chopping wave, but at start point of a counter.

The other object of the present invention is to provide the pulse width modulation control system which is capable of generating automatically two reference voltage values on single chopping wave without using a dual carrier method.

To achieve above-mentioned objects, the present invention comprises a counter which outputs chopping wave crossed at maximum voltage value and minimum voltage value after receiving clock input, an adder/subtracter which increases/decreases voltage signal outputted from the counter, a reference voltage value generation unit which outputs two reference voltage value having different value to single chopping wave after receiving voltage signal outputted from the adder/subtracter, a comparator which separately compares reference voltage value generated by the reference voltage value generation unit with voltage value outputted from the adder/subtracter, and an output control unit which outputs PWM (Pulse Width Modulation) positive signal ($S_{PWM+}$) and PWM (Pulse Width Modulation) negative signal ($S_{PWM-}$) in accordance with output voltage value of the comparator.

BRIEF DESCRIPTION OF THE DRAWINGS

FIGS. 3A and 3B are wave form diagrams of chopping wave having upper carrier and lower carrier according to conventional technology.

DETAILED DESCRIPTION OF THE PREFERRED EMBODIMENT

Figures 1A, 1B, 1C:
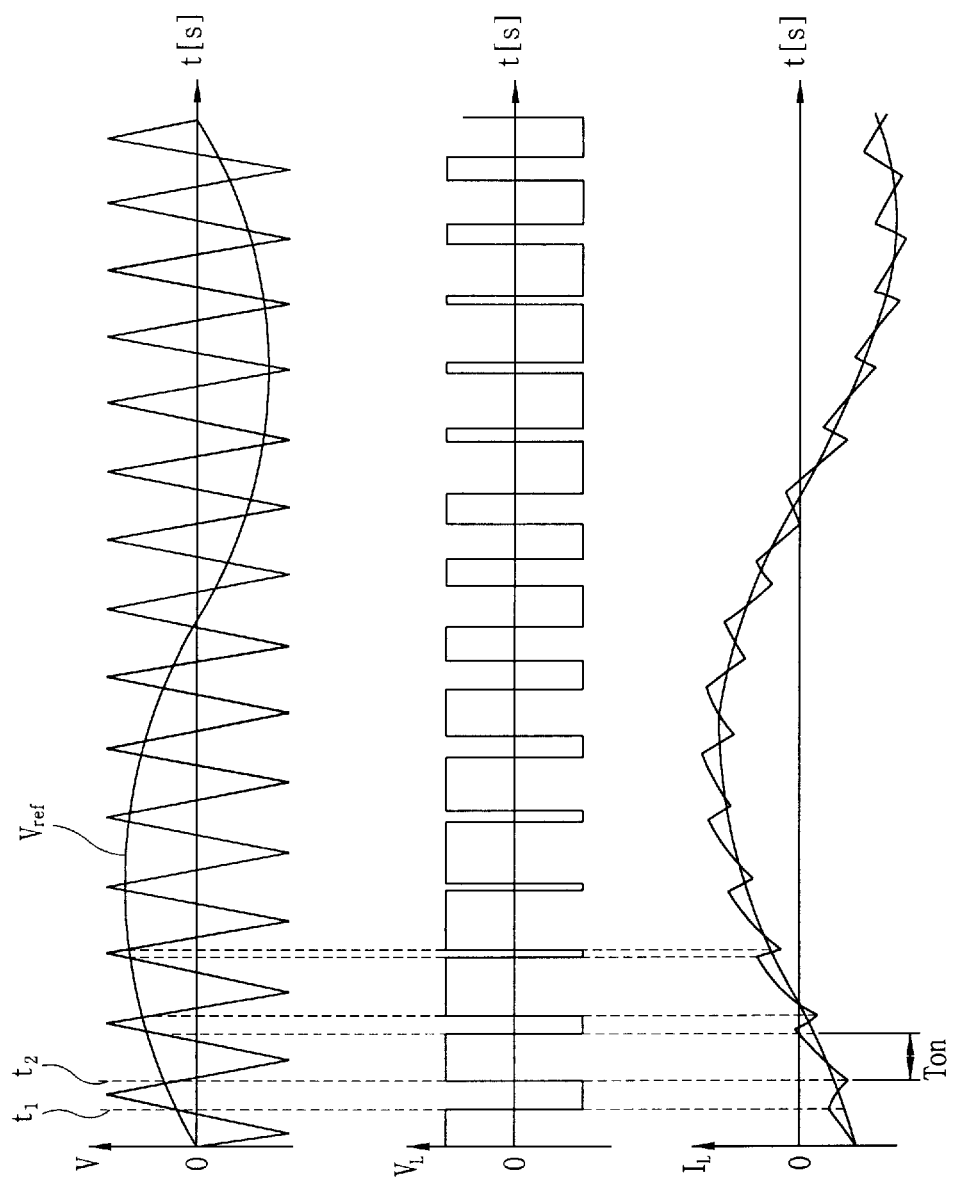
FIGS. 1A, 1B and 1C are wave form diagrams of input/output signal of the conventional pulse width modulation control system.
Figure 2:
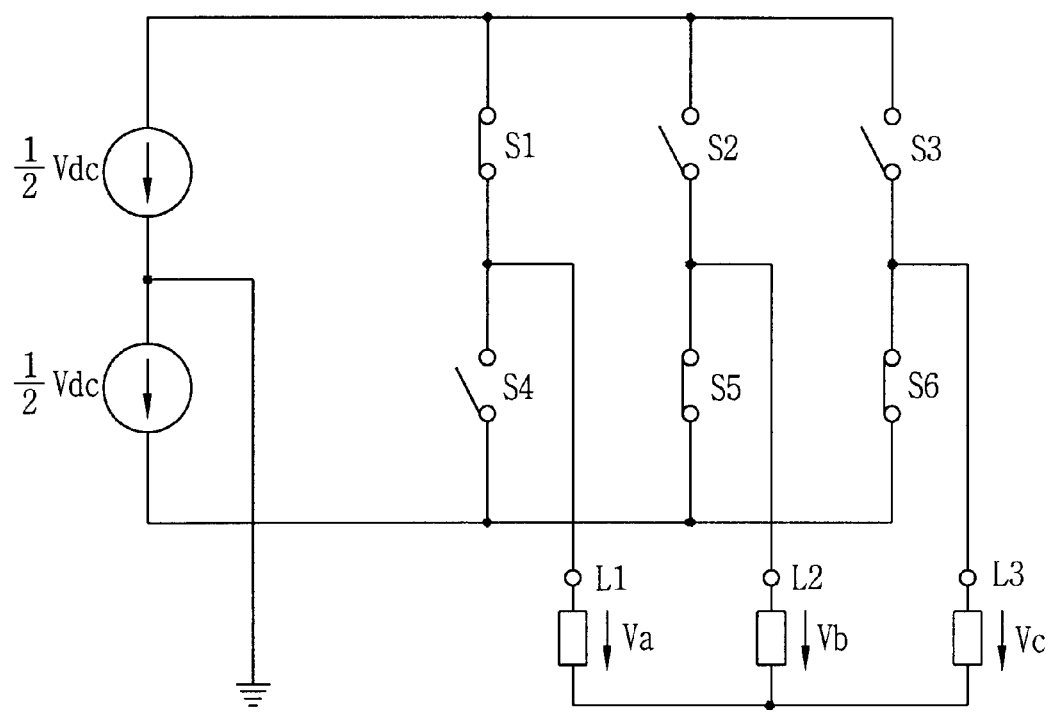
FIG. 2 is a circuit diagram of the conventional three-phase inverter operation circuit.
Figure 4:
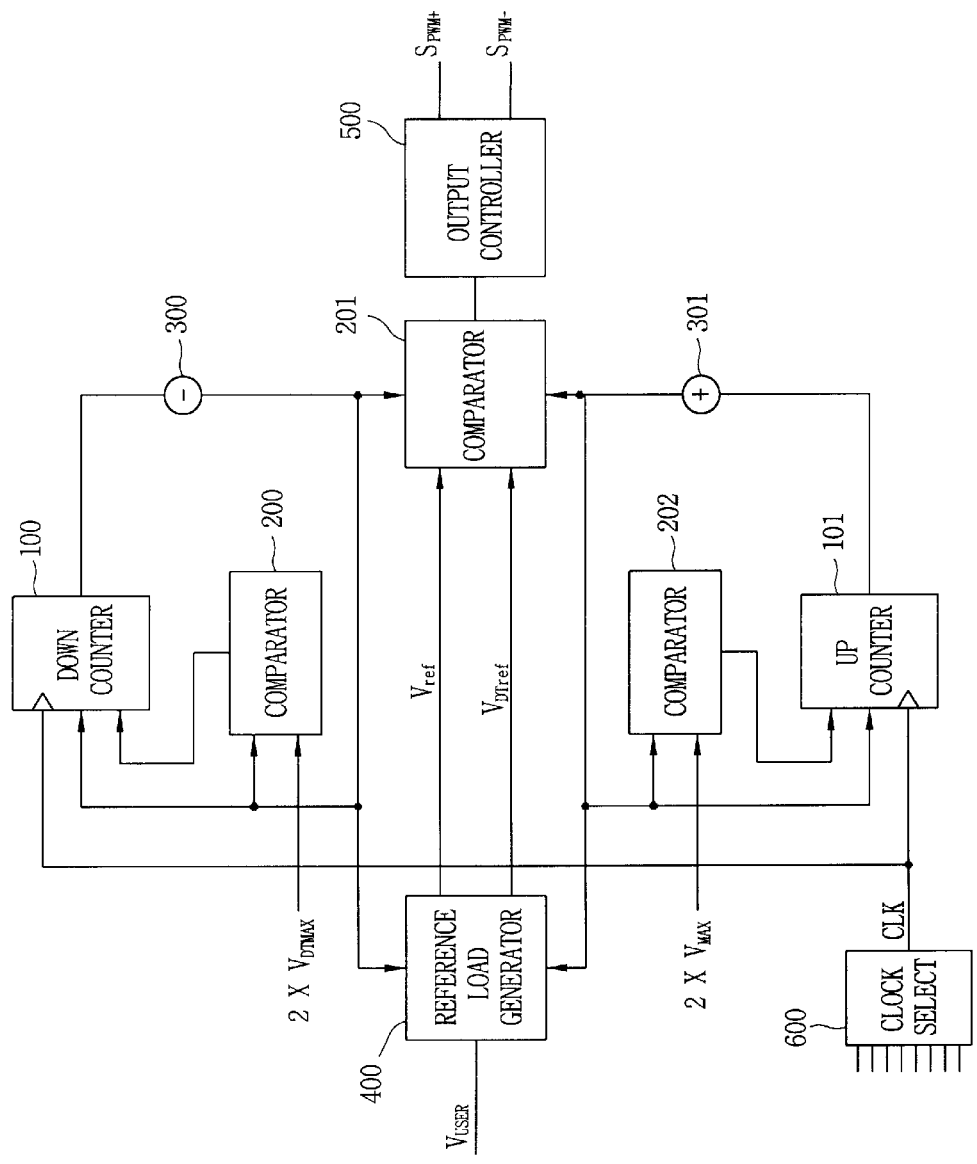
FIG. 4 is a circuit diagram of pulse width modulation control system of the present invention.

FIG. 4 is a circuit diagram of the present invention, it comprises an up counter 101 and an down counter 100 which generate chopping wave after setting initial voltage value of a counter differently in order to get the chopping wave cross at its maximum reference voltage value and minimum reference voltage value clock selection unit 600 which provides clock to the up counter 101 and down counter 100, an adder 301 which orderly adds voltage value counted at the up counter 101, a subtracter 300 which orderly subtracts the voltage value counted at the down counter 100, a reference voltage generation unit 400 which automatically generates two different reference voltage values ($V_{ref}$), ($V_{DTref}$) on single chopping wave, a comparator 201 which separately compares the two different reference voltage values ($V_{ref}$), ($V_{DTref}$) generated from the reference voltage value generation unit 400 with the voltage value outputted from the adder 301 and subtracter 300, an output control unit 500 which separately outputs PWM (Pulse Width Modulation) positive signal ($S_{PWM+}$) and PWM (Pulse Width Modulation) negative signal ($S_{PWM-}$) in accordance with output voltage value of the comparator, a comparator for up counter control 202 which compares output voltage value of the adder 301 with up counter reference voltage value ($2 \times V_{MAX}$) set in advance by a user and stops operation of the up counter 101 when the compared voltage values are same, and a comparator 200 for down counter control 200 which compares output voltage value of the subtracter 300 with down count reference voltage value ($2 \times V_{DTMAX}$) set in advance by the user and stops operation of the down counter 100 when the compared voltage values are same.

The operation and effects of the present invention will now be described in detail.

As depicted in FIG. 4, the up counter 101 and down counter 100 have different start point, but operate at the same time. Initial voltage value of the up counter 101 is 0[V], initial voltage value of the down counter 100 is $2 \times V_{MAX}$[V], and the initial voltage value set by the user is maximum voltage value.

Figure 5:
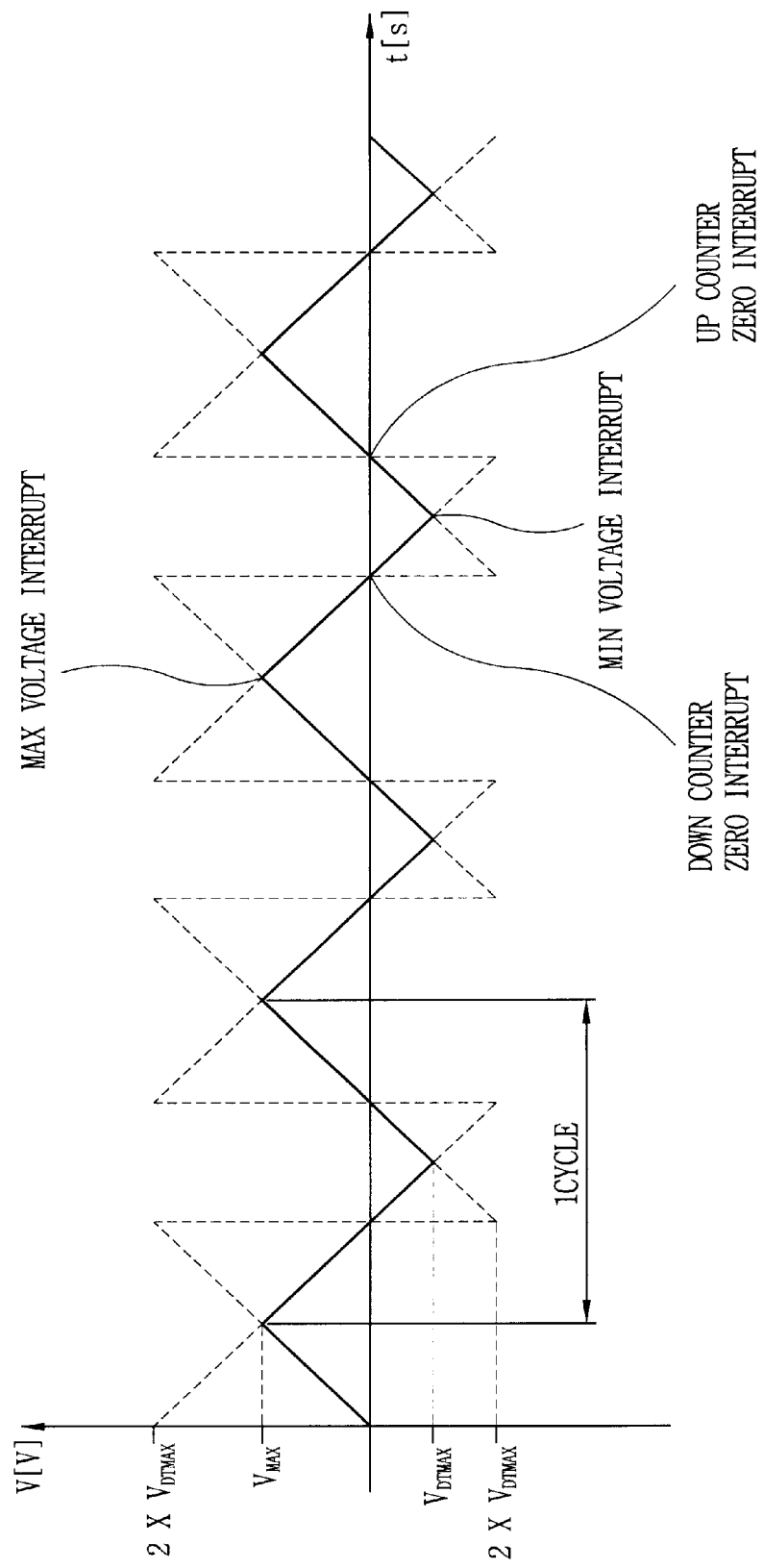
FIG. 5 is a wave form diagram of pulse width modulation control system of the present invention.

The clock selection unit 600 separately provides clock to the up counter 101 and down counter 100. As depicted in FIG. 5, the up counter 101 up-counts from $2 \times V_{DTMAX}$[V] to $2 \times V_{MAX}$[V] and provides it to the adder 301, and the down counter 100 down-counts from $2 \times V_{MAX}$[V] to $2 \times V_{DTMAX}$[V] and provides it to the subtracter 300. The $V_{MAX}$, $V_{DTMAX}$ [V] are voltage values set by the user and show maximum voltage value and minimum voltage value of chopping wave.

Meanwhile, the adder 301 orderly adds the voltage value counted at the up counter 101 and separately provides the added voltage value to the comparator 201, comparator for up count control 202 and reference voltage value generation unit 400.

The subtracter 300 orderly subtracts the voltage value counted at the down counter 100 and separately provides the subtracted voltage value to the comparator 201, comparator for counter control 200 and reference voltage value generation unit 400.

Accordingly, the comparator 202 compares the voltage value added at the adder 301 with the reference voltage value ($2 \times V_{MAX}$) and provides it to the up counter 101. The up counter 101 counts the voltage value added at the adder 301 until it is same with the reference voltage value ($2 \times V_{MAX}$).

Meanwhile, the comparator for down counter control 200 compares the voltage value subtracted at the subtracter 300 with the reference voltage value ($2 \times V_{DTMAX}$) and provides to the down counter 100. The down counter 100 counts the subtracted voltage value until it is same with the reference voltage value ($2 \times V_{DTMAX}$).

When the above operation is performed, the reference voltage value generation unit 400 sets reference voltage value ($V_{ref}$) compared with the up counter and reference voltage value ($V_{DTref}$) compared with the down counter, separately provides it to the comparator 201, and controls renewal start point of reference voltage value.

When the up counter 101 and down counter 100 stop count operation, the reference voltage value generation unit 400 stops output of reference voltage value, and renews reference voltage value at count start point of the up counter 101 and down counter 100. Accordingly, the present invention can overcome a dead time problem of the dual carrier method by renewing reference voltage value at start point of the up/down counter 101, 101 when reference voltage value exists between the upper carrier and lower carrier.

When the reference voltage value generation unit 400 outputs reference voltage value ($V_{ref}$) compared with the up counter and reference voltage value ($V_{DTref}$) compared with the down counter to the comparator 201, and the comparator 201 provides the voltage value outputted from the adder/subtracter 301, 300 and the result value according to the comparison to the output control unit 500.

The comparator 201 compares reference voltage value ($V_{ref}$) generated from the reference voltage value generation unit 400 with the output voltage value of the adder/subtracter 301, 300, when the reference voltage value ($V_{ref}$) is same with the voltage value of the adder 301, it outputs "1" to the output control unit 500, when the reference voltage value ($V_{ref}$) is not same with the voltage value of the adder 301, the reference voltage value ($V_{ref}$) is compared with the subtracter 300 and the values are same, the comparator 201 outputs "0" to the output control unit 500. The output control unit 500 receiving the comparison voltage value outputs PWM (Pulse Width Modulation) positive signal ($S_{PWM+}$).

The comparator 201 compares the other reference voltage value ($V_{DTref}$) generated from the reference voltage value generation unit 400 with the output voltage value of the adder 301 and subtracter 300, when the reference voltage value is same with the voltage value of the adder 301, it outputs "0" to the output control unit 500, when the reference voltage value is not same with the voltage value of the adder 301, it compares the reference voltage value with the voltage value of the adder 300, when the values are same, "1" is provided to the output control unit 500, and the output control unit 500 receiving the comparison voltage value outputs PWM (Pulse Width Modulation) negative signal ($S_{PWM-}$).

According to the above operation, each reference voltage value is compared with voltage value of the counter, the up counter and down counter outputs chopping wave crossed at its maximum voltage value and minimum voltage value.

FIG. 5 is a wave form diagram of pulse width modulation control system of the present invention. It illustrates $V_{MAX}$, $2 \times V_{MAX}$, $V_{DTMAX}$, $2 \times V_{DTMAX}$, MAX Voltage Interrupt and Min Voltage Interrupt.

Figure 6:
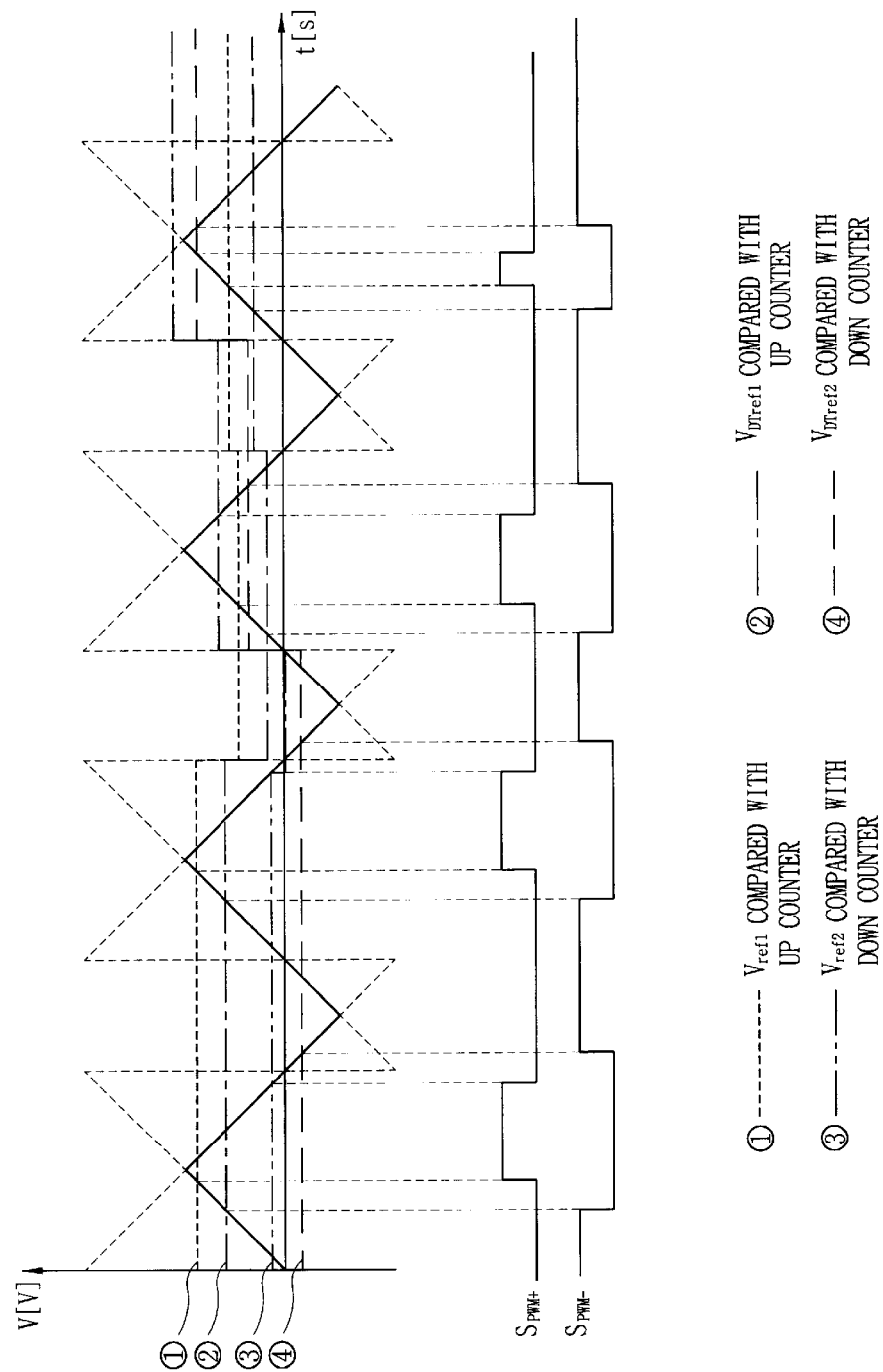
FIG. 6 is a wave form diagram of pulse width modulation control system of the present invention.

FIG. 6 is a wave form diagram of pulse width modulation control system of the present invention. It illustrates reference voltage value compared with the up counter, reference voltage value compared with the down counter, reference dead time voltage compared with the up counter and reference dead time voltage compared with the down counter, and illustrates output change of the PWM (Pulse Width Modulation) positive signal ($S_{PWM+}$) and PWM (Pulse Width Modulation) negative signal ($S_{PWM-}$) outputted from the output control unit. Herein, renewal point of reference voltage value compared with the up counter is same with start point of the up counter, and renewal point of reference voltage value compared with the down counter is same with start point of the down counter.

As described above, the present invention is capable of securing dead time, and controlling precisely a converter or an inverter by outputting chopping wave crossed at its maximum voltage value and minimum voltage value and renewing reference voltage value at start point of the up/down counter.

What is claimed is:

1. A pulse width modulation control system, comprising:
   an up counter and a down counter, each of which outputs a voltage value, wherein the voltage value is a chopping wave crossed at its maximum voltage value and minimum voltage value after receiving a clock input;
   an adder which sequentially adds the voltage value generated from the up counter;
   a subtracter which sequentially subtracts the voltage value generated from the down counter;
   a reference voltage value generation unit which outputs two different reference voltage values after receiving the voltage values outputted from the adder/subtracter and a reference voltage value set by a user;
   a comparator which separately compares the reference voltage values generated from the reference voltage value generation unit with voltage values outputted from the adder and subtracter, respectively, and generates an output voltage value; and
   an output control unit which outputs a PWM positive signal and a PWM negative signal in accordance with output voltage value of the comparator.

2. The pulse width modulation control system according to claim 1, wherein the initial voltage value of the up counter is 0, the initial voltage value of the down counter is 2×V$_{MAX}$, the initial voltage values are set by a user, and when the chopping wave is outputted from the counter, the counter gets the chopping wave to cross at its maximum voltage value and minimum voltage value, wherein 2×V$_{MAX}$ is an up count reference voltage.

3. The pulse width modulation control system according to claim 1, wherein the reference voltage value generation unit generates an upper reference voltage value and a lower reference voltage value and controls a renewal point of the reference voltage values when the reference voltage values of the up counter and down counter are set by the user.

4. The pulse width modulation control system according to claim 3, wherein the renewal point of the reference voltage value of the up counter is the start point of the up counter, and the renewal point of the reference voltage value of the down counter is the start point of the down counter.

5. The pulse width modulation control system according to claim 1, wherein the comparator includes a comparator which compares the reference voltage values outputted from the reference voltage value generation unit with reference voltage values outputted from the adder/subtracter, an up counter control comparator which stops operation of the up counter when an output voltage value of the adder is the same as a voltage value set in advance at the reference voltage value generation unit, and a down counter control comparator which stops operation of the down counter when output voltage value of the subtracter is the same as a voltage value set in advance at the reference voltage value generation unit.

6. The pulse width modulation control system according to claim 1, wherein the output control unit outputs '1' when the upper reference voltage value is the same as a voltage value of the up counter, or outputs '0' when the upper reference voltage value is the same as a voltage value of the down counter in case of PWM positive signal output, and the output control unit outputs '0' when lower reference voltage value is the same as a voltage value of the up counter, or outputs '1' when the lower reference voltage value is the same as a voltage value of the down counter in case of PWM negative signal output.

7. The pulse width modulation control system according to claim 1, wherein a second comparator compares the voltage value added at the adder with the reference voltage value and generates an output value to the up counter.

8. The pulse width modulation control system according to claim 1, wherein a third comparator compares the voltage value subtracted at the subtracter with the reference voltage value and generates an output value to the down counter.

9. The pulse width modulation control system according to claim 1, wherein the up counter 101 counts from 2×V$_{DTMAX}$ to 2×V$_{MAX}$ and provides the value to the adder, and the down counter counts from 2×V$_{MAX}$ to 2×V$_{DTMAX}$ and provides the value to the subtracter, wherein 2×V$_{DTMAX}$ and 2×V$_{MAX}$ are a down counter reference voltage and an up count reference voltage, respectively.

* * * * *